US005109328A

United States Patent [19]

Kijima

[11] Patent Number: 5,109,328

[45] Date of Patent: Apr. 28, 1992

[54] PUSH-PULL INVERTER EMPLOYING CURRENT FEEDBACK

[75] Inventor: Seiichi Kijima, Tokyo, Japan

[73] Assignee: Kijima Co., Ltd., Tokyo, Japan

[21] Appl. No.: 596,243

[22] Filed: Oct. 12, 1990

[30] Foreign Application Priority Data

Oct. 24, 1989 [JP] Japan ................................ 1-274825
Jan. 9, 1990 [JP] Japan .................................... 2-1117

[51] Int. Cl.[5] ........................................ H02M 7/538

[52] U.S. Cl. .................................... 363/133; 315/223; 331/114

[58] Field of Search ....................... 363/24, 22, 133.23; 331/113 R, 114; 315/219, 222, 223

[56] References Cited

U.S. PATENT DOCUMENTS 3,159,800 12/1964 Massey ........................... 331/113 R
3,383,624 5/1968 Fiala ............................... 331/113 R
3,453,520 7/1969 Mas ..................................... 363/22
4,322,789 3/1982 de Mere ............................ 315/219

FOREIGN PATENT DOCUMENTS 1219546 6/1966 Fed. Rep. of Germany ...... 331/114
936625 9/1963 United Kingdom ................ 363/133

*Primary Examiner*—William H. Beha, Jr.
*Attorney, Agent, or Firm*—Spensley Horn Jubas & Lubitz

[57] ABSTRACT

This invention relates to a push-pull inverter used, for example, as a driver for cold-cathod discharge tube, hot-cathode discharge tube, etc.

According to this invention, respective control electrodes of a first switching element and a second switching element are interconnected by a capacitor so that a load current passes through this capacitor and thereby alternately activates the first and second switching element.

With such arrangement, a boosting transformer requires no feedback coil and it is possible to eliminate a capacitor for resonance which has conventionally been connected in parallel to a primary coil of said boosting transformer.

5 Claims, 7 Drawing Sheets

PUSH-PULL INVERTER EMPLOYING CURRENT FEEDBACK

BACKGROUND OF THE INVENTION

1. Field of the Invention

This invention relates to a push-pull inverter used, for example, as a driver for cold-cathode discharge tube, hot-cathode discharge tube, etc.

2. Background Art

FIG. 8 illustrates a conventional embodiment of the push-pull inverter constructed as the driver for a fluorescent lamp 11.

This inverter is a push-pull circuit substantially comprising a booster transformer 12, transistors 13, 14 for switching function, a capacitor 15 for a resonance circuit and a choke coil 16.

Upon closure of a source switch 17, a transistor 18 serving as a power supply switch is turned on so as to supply the push-pull circuit with DC power from a DC source 19.

Then, the transistors 13, 14 are supplied through resistors 20, 21, respectively, with their base current. Though both the transistors 13, 14 are consequently switched to their conductive states, they are different from each other in transistor characteristic and circuit arrangement so that one of them becomes more positively conductive than the other and said one transistor is turned on earlier than the other.

For example, when the transistor 13 is turned on earlier than the transistor 14, the current supplied from the DC source 19 passes through the choke coil 16 into a primary coil 12P (more strictly to say, a primary coil section $\mathbf{12P_1}$ on one side) of the transformer 12 and this primary coil 12P generates thereacross the voltage of a direction as indicated by a solid line arrow in FIG. 8, resulting in that a collector potential of the transistor 13 becomes lower than a collector potential of the transistor 14.

Since, at this time point, a tertiary coil 12F generates thereacross the voltage of a direction as indicated by a solid line arrow in FIG. 8, the base of the transistor 13 is affected by a posttive feedback effect and the collector current of this transistor 13 rapidly increases. Thereupon, a secondary coil 12S generates thereacross the inductive voltage of a direction as indicated by a solid line arrow in FIG. 8, which initiates lighting of the fluorescent lamp 11.

Since increase in the current flowing through the transistor 13 is suppressed at a saturation point which depends upon a base current as well as an amplification degree, the voltage of a direction as indicated by a broken line arrow in FIG. 8 is generated across the primary coil 12P of the transformer 12 and the transistor 13 is switched from ON to OFF while the transistor 14 is switched from OFF to ON, as said increase in the current is reduced When the transistor 14 is turned on, the voltage of a direction as indicated by a broken line arrow in FIG. 8 is generated across the tertiary coil 12F and consequently the base of the transistor 14 is affected by the positive feedback and the current flowing through the transistor 14 increases, resulting in that the inductive voltage of a direction as indicated by a broken line arrow in FIG. 8 is generated across the secondary coil 12S, which maintains lighting of the fluorescent lamp 11.

Thereafter alternate turning-on of the transistors 13, 14 repeatedly occurs in the same manner as has been mentioned above, generating a high AC voltage across the secondary coil 12S.

The primary coil 12P of the transformer 12 forms, in cooperation with the capacitor 15, a resonance circuit. Under a resonance voltage of this resonance circuit, the secondary coil 12S outputs an AC voltage $V_9$ and an alternating current $I_9$ as shown by FIG. 9 and the fluorescent lamp 11 has a load voltage $V_{10}$ and a load current $I_{10}$ as shown by FIG. 10.

Referring to FIG. 8, reference numeral 22 designates a capacitor for stabilized source voltage and reference numeral 23 designates a capacitor for stabilized operation.

In the inverter of prior art as has been described above, the transformer 12 must be provided with the tertiary coil 12F for feedback Consequently, at least a step of winding said tertiary coil 12F and a step of soldering opposite ends of this coil to respective terminal pins are additionally required. This is undesirable for improvement in efficiency with which the transformer is produced Since the above-mentioned transformer 12 is small-sized, provision of said tertiary coil 12F requires the terminal pins exclusively for this coil, which makes miniaturization of the transformer 12 difficult.

Specifically, said transformer 12 requires seven terminal pins in total, comprising three terminal pins for the primary coil 12P, two terminal pins for the secondary coil 12S and two terminal pins for the tertiary coil 12F.

One of the terminal pins to be used as the terminal on the high voltage side of the secondary coil 12S should be spaced from the other terminal pins and fixed to one flange of a bobbin on which the coil is wound (a bobbin provided on opposite sides of the wounded area with flanges) while the other terminal pins are fixed to the other flange. In other words, said other flange are provided with six terminal pins fixed thereto at suitable angular intervals and, in consequence, the bobbin should have a relatively bulky configuration, making a desired miniaturization of the transformer difficult.

It should be understood that, in FIG. 8, the terminal pin to which a beginning end of the secondary coil 12S is connected serves as the terminal pin on the high voltage side.

Additionally, in the above-mentioned inverter of prior art, the primary coil 12P of the transformer 12 must include the capacitor 15 for the resonance circuit. Resonance current flowing through the resonance circuit causes the input current from the DC source 19 and, therefore, heating of the transformer 12 to increase. The problem of such heating becomes serious as the transformer is miniaturized.

SUMMARY OF THE INVENTION

In view of the stand of art as has previously been described, it is an object of the invention to develop a push-pull inverter including a transformer with a tertiary coil for feedback being eliminable and a capacitor for a resonance circuit being selectively eliminable.

The object set forth above is achieved, in accordance with the invention, by a push-pull inverter including a boosting transformer provided with a primary coil having a center tap and a secondary coil for load connection, and first and second switching elements having control electrodes adapted for alternate interruption of the current flowing through a primary coil section on one side and the current flowing through a primary coil section on the other side with respect to the center tap, wherein there is provided a capacitor adapted to connect the control electrodes of the first switching element and the second switching element; and wherein there is provided a positive feedback circuit adapted to activate the first and second switching elements alternately so that a load current may flow into said capacitor.

In the above-mentioned inverter, an alternating current flowing into a load passes through the control electrodes of the first and second switching elements which are, in turn, alternately activated by a positive feedback effect of the load current.

This switching operation causes the primary coil section on one side and the primary coil section on the other side with respect to the center tap to be alternately applied with an input current while an output voltage substantially of an AC waveform appears across the secondary coil.

A capacitor may be connected in parallel with the primary coil of the transformer to bring the output voltage further close to the AC voltage.

With the push-pull inverter of the invention as mentioned above, it is possible to improve an efficiency with which the transformer is produced because the transformer requires no tertiary coil for feedback and miniaturization of the transformer is significantly facilitated because the terminal pins for the tertiary coil can be eliminated.

Furthermore, the push-pull inverter of the invention allows the capacitor which has conventionally been connected in parallel with the primary coil of the transformer to form the resonance circuit in prior art to be eliminated. Elimination of such capacitor results in a substantially reduced heating of the transformer and, therefore, in a highly efficient inverter

DESCRIPTION OF THE PREFERRED EMBODIMENTS

The first embodiment of the invention will be described in reference with the accompanying drawings.

Figure 1:
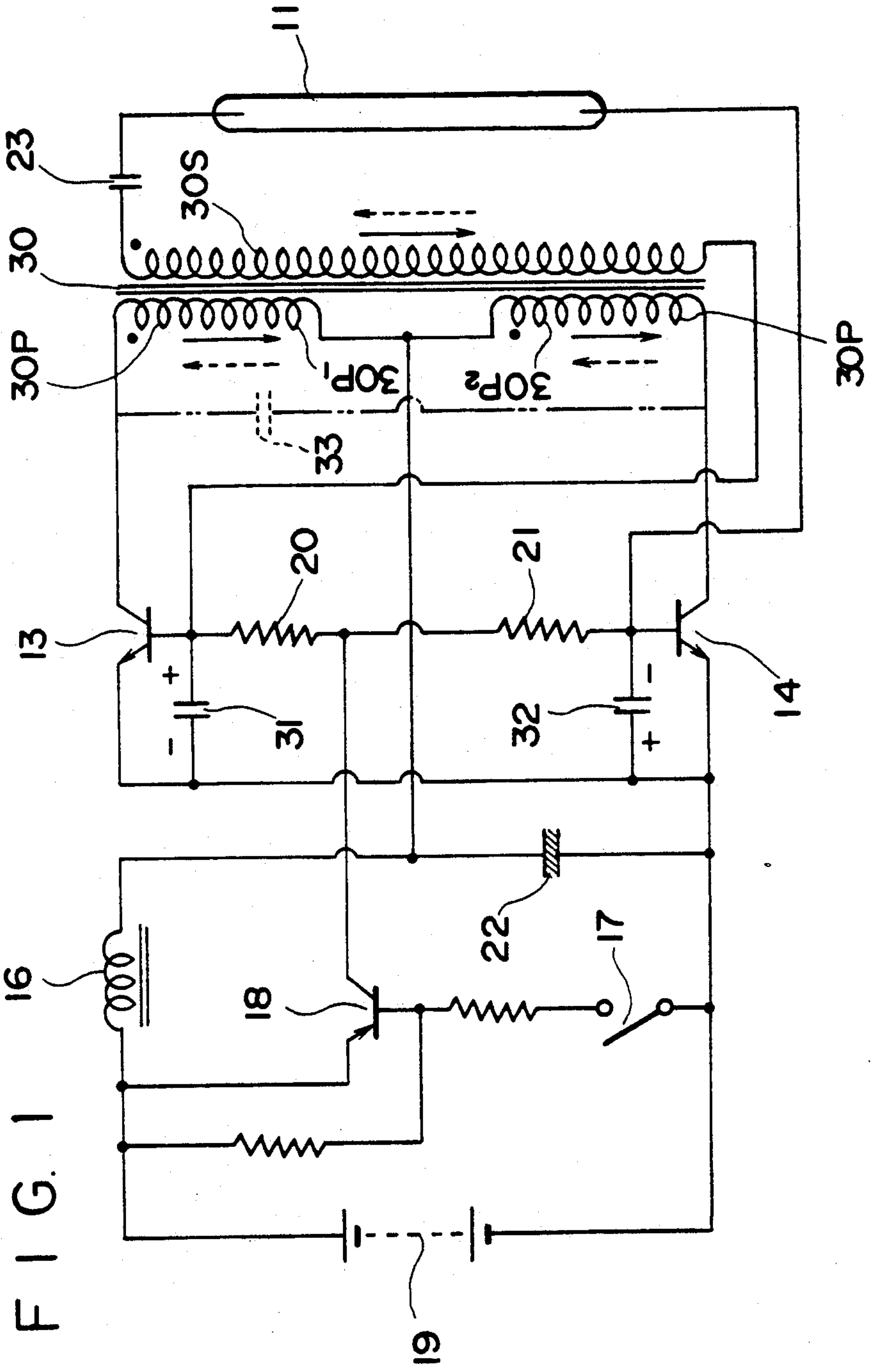
FIG. 1 is a circuit diagram of a push-pull inverter as a first embodiment of the invention.

The push-pull inverter shown by FIG. 1 utilizes a boosting transformer 30 including a primary coil 30P having a coil section 30P$_1$ on one side and a coil section 30P on the other side, and a secondary coil 30S.

In this transformer 30, one end (on a high voltage side) of the secondary coil 30S is connected through a capacitor 23 to one electrode of a fluorescent lamp 11 and the other end (on a low voltage side) is connected to a base of a transistor 13.

The other electrode of the fluorescent lamp 11 is connected to a base of the transistor 14 and bias capacitors 31, 32 are connected between the respective bases and emitters of the transistors 13, 14.

A capacitor 33 as indicated by a two-dot-chain line for the resonance circuit is optional and not essential.

Figure 8:
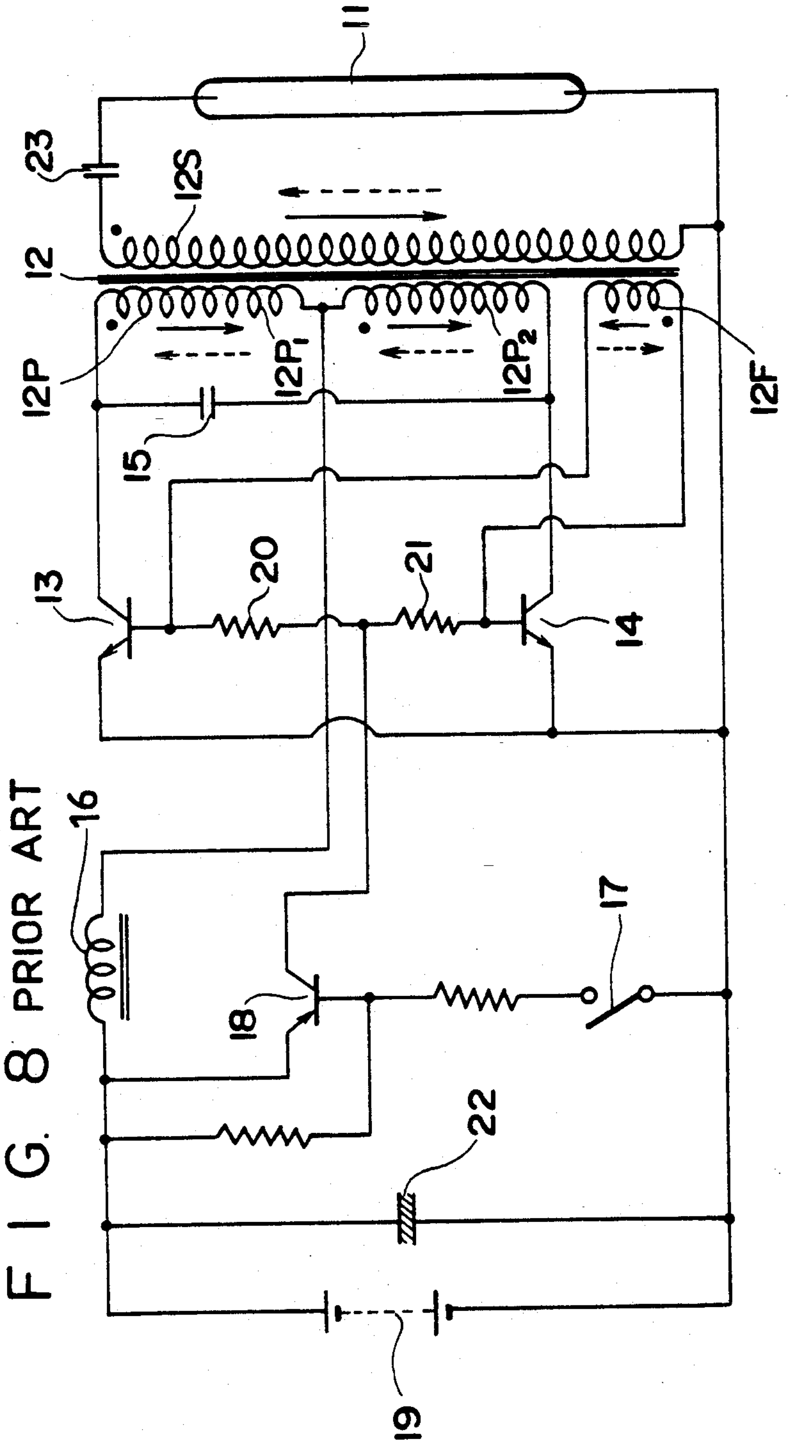
FIG. 8 PRIOR ART
FIG. 8 is a circuit diagram of the conventional push-pull inverter.

The remainder is similar to the conventional push-pull inverter as has previously been mentioned in reference with FIG. 8 and therefore the components being similar to those in FIG. 8 are designated by the respectively corresponding reference numerals.

As in case of the conventional inverter, this embodiment also is initiated to oscillate by closing the source switch 17.

Upon closure of the source switch 17, the transistors 13, 14 are supplied through the resistors 20, 21, respectively, with the base current by which any one of these transistors is turned on earlier than the other. For example, when the transistor 13 is first turned on, the current flowing through the primary coil section 30P$_1$ generates across the primary coil 30P of the transformer 30 a voltage directed as indicated by a solid line arrow in FIG. 1 and across the secondary coil 30S the output voltage of a direction as indicated by a solid line arrow.

Since an initial load current flowing through the fluorescent lamp 11 passes through the secondary coil 30S, the base-emitter of the transistor 13, the capacitor 32, the fluorescent lamp 11, the capacitor 23, and again the secondary coil 30S, in this order, the transistor 13 has its collector current rapidly increasing under a positive feedback effect and simultaneously an output voltage across the secondary coil 30S, which is directed as indicated by a solid line arrow, correspondingly increases. Thus, lighting of the fluorescent lamp 11 is initiated.

When the transistor 13 reaches its specific saturation point, said increase in current is suppressed and the voltage of a direction as indicated by a broken line arrow transistor 13 is switched from ON to OFF and the transistor 14 is switched from OFF to ON.

Consequently, the current flowing through the primary coil section 30P$_2$ generates the voltage of a direction as indicated by a broken line arrow across the primary coil 30P of the transformer 30 and the output voltage of a direction as indicated by a broken line arrow across the secondary coil 30S thereof.

At this time point, the transistor 14 is affected by the positive feedback effect due to the initial load current flowing through the fluorescent lamp 11. Accordingly, the collector current of this transistor 14 rapidly increases and lighting of the fluorescent lamp 11 is maintained by the output voltage appearing across the secondary coil 30S in the direction as indicated by the broken line arrow in FIG. 1.

At this time point, the load current flows through the fluorescent lamp 11 in the direction opposed to that as has been mentioned above, so the capacitors 31, 32 are charged in the directions opposed to those as determined by the polarities of the respective capacitors shown in FIG. 1.

In this manner, under the positive feedback effect of the load current flowing through the fluorescent lamp 11, alternate turning-on of the transistors 13, 14 repeatedly occurs to maintain the oscillation.

Figure 2:
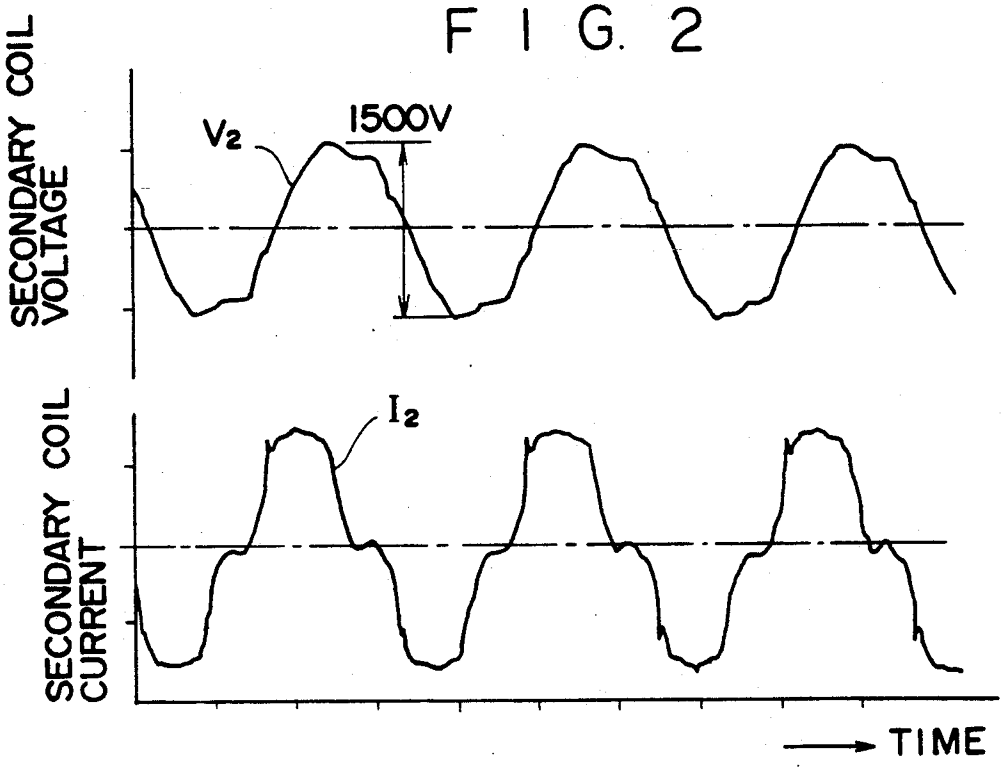
FIG. 2 is a waveform diagram of output voltage and output current obtained when there is provided no capacitor for a resonance circuit.

FIG. 2 is a waveform diagram of output voltage $V_2$ and output current $I_2$ from the transformer 30 when there is not provided the capacitor 33 for the resonance circuit.

Figure 9:
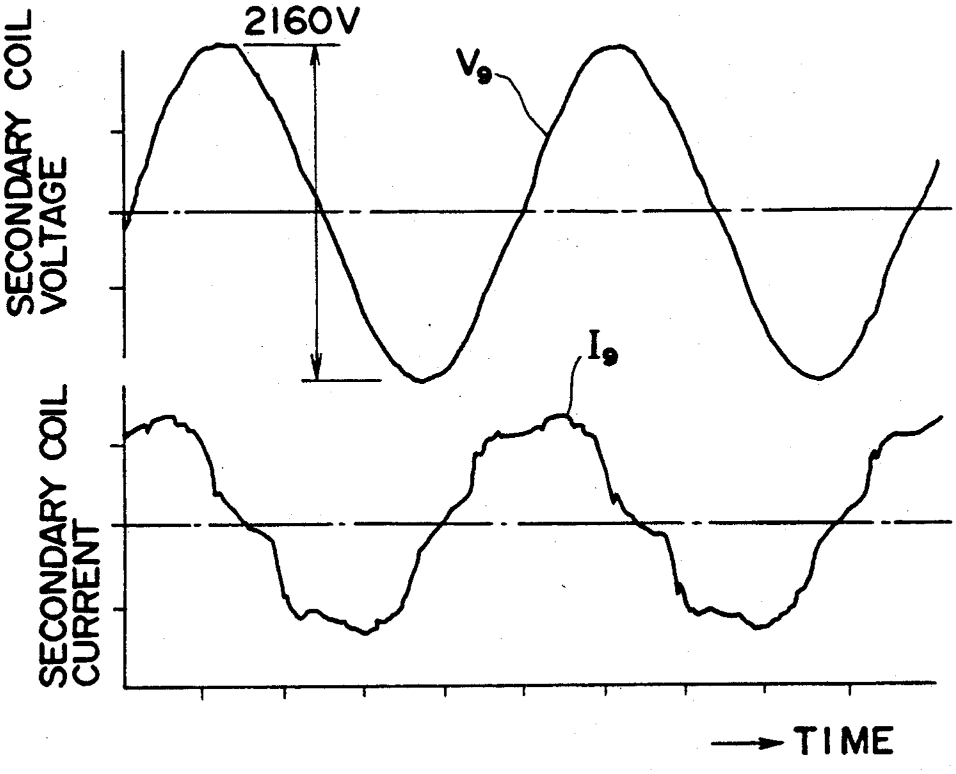
FIG. 9 PRIOR ART
FIG. 9 is a waveform diagram of output voltage and, output current in said conventional push-pull inverter.
Figure 10:
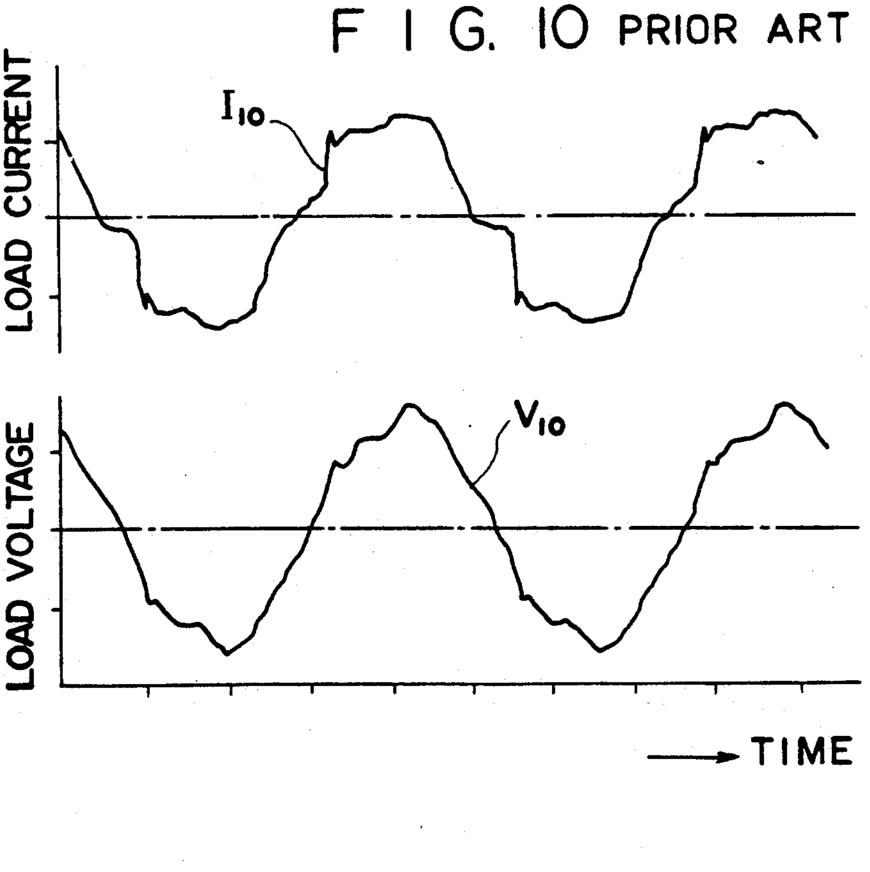
FIG. 10 PRIOR ART
FIG. 10 is a waveform diagram of load voltage and load current applied by said conventional push-pull inverter to the fluorescent lamp.

As will be apparent from FIG. 2, said output voltage $V_2$ presents an AC voltage waveform which is more or less distorted in comparison with the output voltage $V_9$ of the conventional inverter as shown by FIG. 9, but there occurs practically no adverse affection on lighting of the fluorescent lamp 11.

Figure 3:
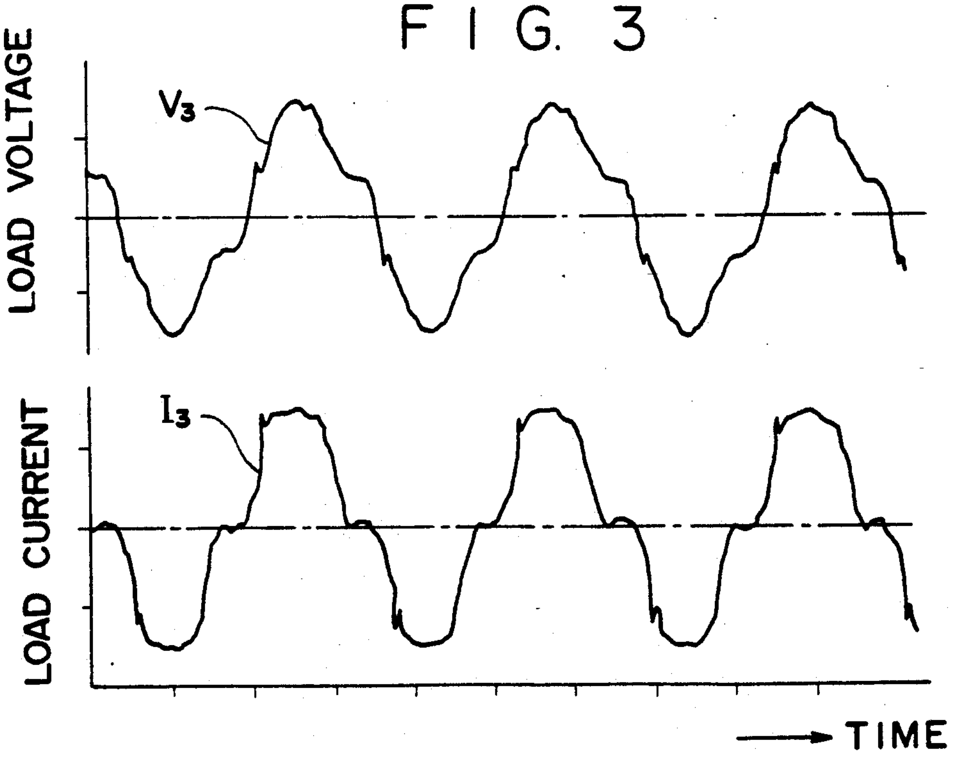
FIG. 3 is a waveform diagram of load voltage and load current applied to a fluorescent lamp when there is provided no capacitor for the resonance circuit.

FIG. 3 is a waveform diagram of load voltage $V_3$ and load current $I_3$ acting upon the fluorescent lamp 11 due to said output voltage $V_2$.

The pulse-like load current $I_3$ as shown causes the transistors 13, 14 to be affected by the positive feedback effect.

Figure 4:
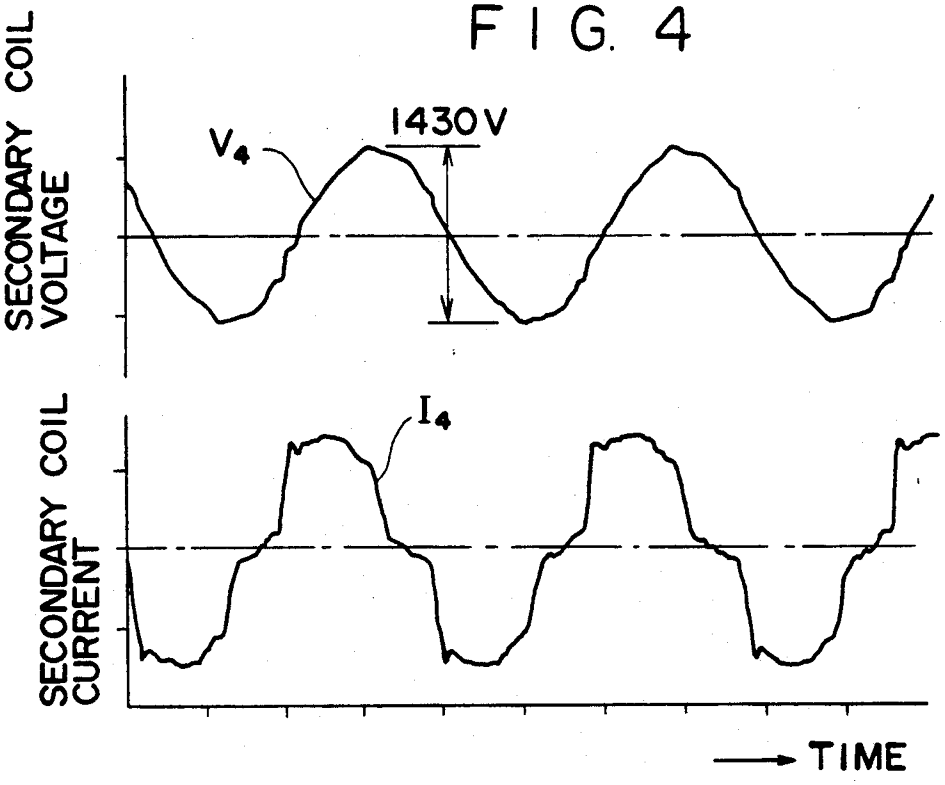
FIG. 4 is a waveform diagram of output voltage and output current obtained when there is provided the capacitor for the resonance circuit.

FIG. 4 is a waveform diagram of output voltage $V_4$ and output current $I_4$ of the transformer 30 observed when there is provided the capacitor 33 for the resonance circuit.

The output voltage $V_4$ presents, as seen in FIG. 4, an AC voltage waveform substantially similar to said conventional inverter output voltage $V_9$ as shown by FIG. 9.

Figure 5:
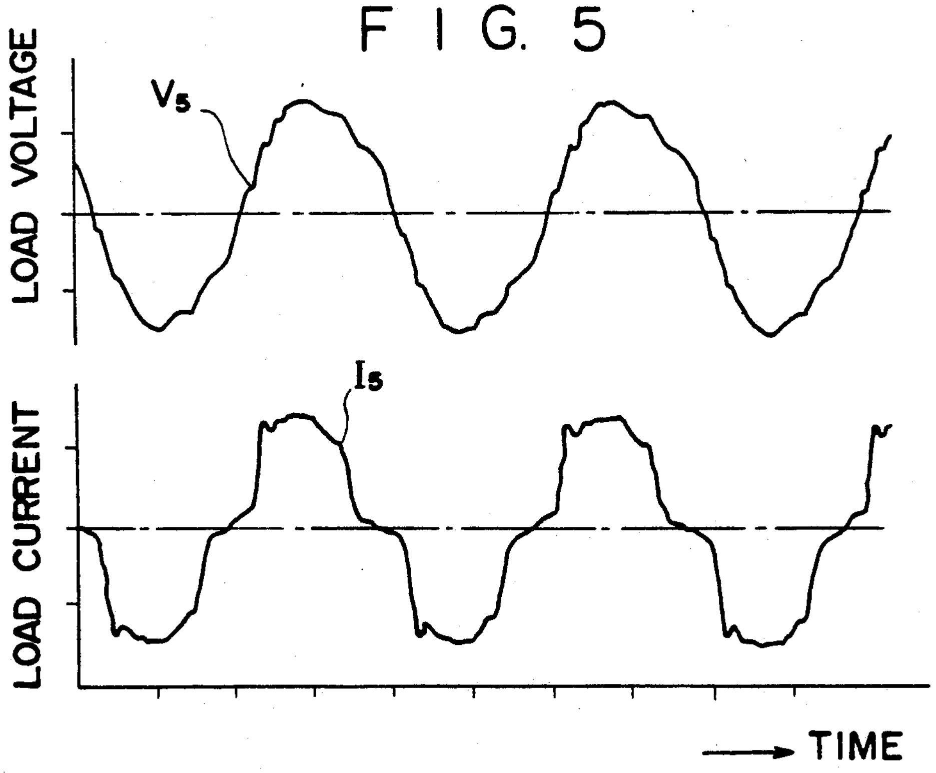
FIG. 5 is a waveform diagram of load voltage and load current applied to the fluorescent lamp when there is provided the capacitor for the resonance circuit.

FIG. 5 is a waveform diagram of load voltage $V_5$ and load current $I_5$ acting upon the fluorescent lamp 11 due to said output voltage $V_4$.

Now the result of a series of experiments conducted on the instant embodiment of the inverter will be shown in Table 1.

This series of experiments were conducted using a DC source of 12V, a load voltage of 2175 V, an ambient temperature of 20° C. and a transformer 30 comprising a primary coil section 30P$_1$ on one side and a primary coil section 30P$_2$ on the other side of the center tap each carrying a winding of 25 turns ($\phi$0.16) and a secondary coil 30S carrying a winding of 1500 turns ($\phi$0.04).

TABLE 1

| | without capacitor 33 | with capacitor 33 | with feedback winding |
|---|---|---|---|
| input current(A) | 0.12 | 0.13 | 0.13 |
| output voltage(V) | 1500 | 1430 | 2160 |
| output current (marms) | 5.33 | 5.16 | 5.14 |
| efficiency(%) | 80.5 | 71.9 | 71.7 |

It was found in this series of experiments that the temperatures of the primary coil and the secondary coil rise by 9.7° C. and 10.1° C., respectively, without provision of the capacitor 33 for the resonance circuit while the temperatures of these coils rise by 20.6° C. and 18.4° C., respectively, with provision of the capacitor 33, i.e., that the rise in temperature of the transformer is reduced substantially by half when there is not provided said capacitor 33 for the resonance circuit.

Concerning the oscillation frequency, elimination of the capacitor 33 resulted in 62 KHz while provision of said capacitor 33 resulted in 26 KHz and provision of a tertiary coil 12F for feedback as in prior art resulted in 42 KHz.

It should be understood that the invention may be implemented also by using a single capacitor connected between the respective bases of the transistors 13, 14 instead of using the biasing capacitors 31, 32.

The embodiment of the inverter as has been described above is inconvenient in that its oscillation becomes instable during no-load running, i.e., with the fluorescent lamp 11 having been removed. Specifically, in such no-load situation, operation of the transistors 13, 14 becomes instable because these transistors 13, 14 are not under normal feedback effect acting thereupon. Such problem is solved by a second embodiment of the invention as shown by FIG. 6.

Figure 6:
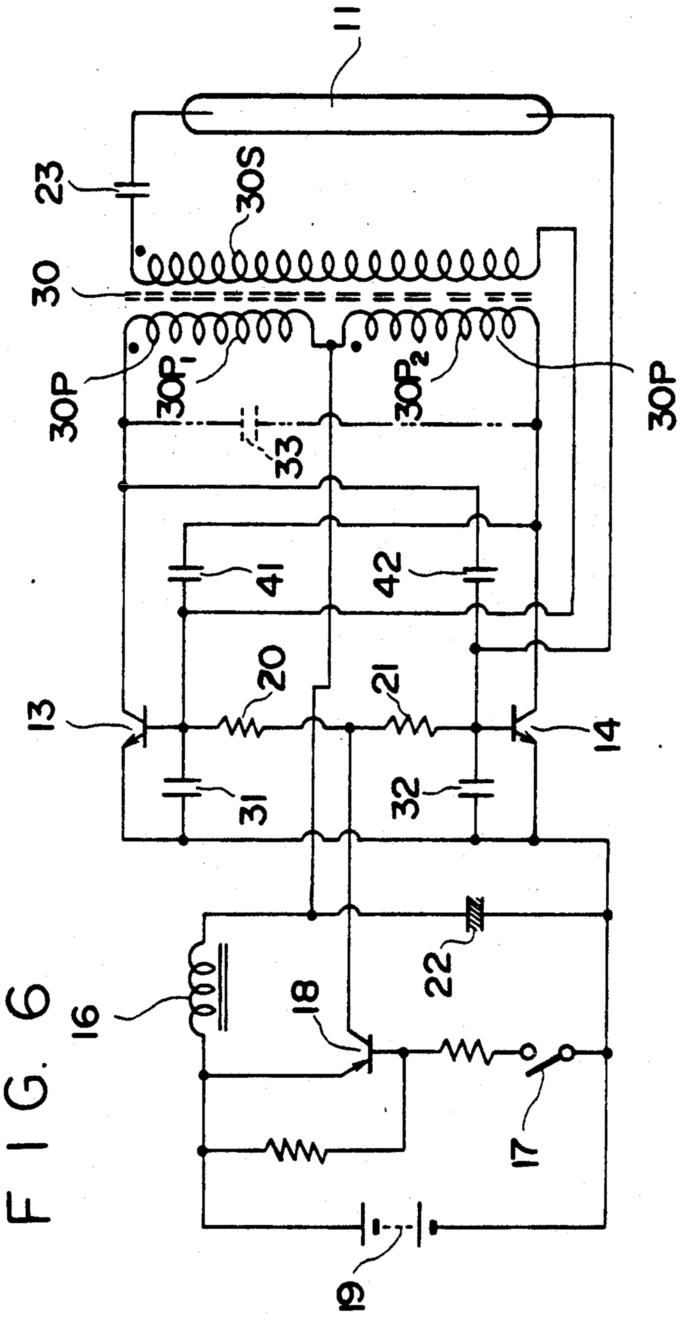
FIG. 6 is a circuit diagram of a push-pull inverter as a second embodiment of the invention.

Referring to FIG. 6 showing the second embodiment of the push-pull inverter constructed according to the invention, reference numeral 41 designates a capacitor connecting the respective bases of the transistors 13, 14, reference numeral 42 designates a capacitor connecting the base of the transistor 14 to the collector of the transistor 13. These two capacitors. 41, 42 form together an auxiliary feedback circuit.

More specifically, when the transistor 13 as the first switching element is switched from ON to OFF, a counter electromotive force is generated in the primary coil section 30P$_1$ on one side of the center tap and a voltage is fed through the capacitor 42 back to the base of the transistor 14, assuring that this transistor 14 is reliably switched from OFF to ON.

Similarly, when the transistor 14 as the second switching element is switched from ON to OFF, a counter electromotive force is generated in the primary coil section 30P$_2$ on the other side of the center tap and a voltage generated thereacross by this counter electromotive force is fed through the capacitor 41 back to the base of the transistor 13, assuring that this transistor 13 is reliably switched from OFF to ON.

The remainder of the circuit arrangement is similar to the first embodiment.

So far as the fluorescent lamp 11 as the load is embodiment operates in the same manner as the inverter of the first embodiment.

Namely, alternate turning ON of the transistors 13, 14 repeatedly occurs under the positive feedback effect as the load current passes through the biasing capacitors 31, 32 to the respective transistors 13, 14.

In the no-load state, i.e., with the fluorescent lamp 11 having been removed, no load current flows through the biasing capacitors 31, 32.

However, the voltage generated across the primary coil section 30P$_1$ upon switching of the transistor 13 from ON to OFF and upon switching of the transistor 14 from OFF to ON is fed through the capacitor 42 back to the base of the transistor 14 and rapidly turns this transistor 14 ON.

Inversely, the voltage generated across the primary coil section 30P$_2$ upon switching of the transistor 14 from ON to OFF is fed through the capacitor 41 to the base of the transistor 13 and rapidly turns this transistor 13 ON.

With a consequence, alternate turning ON of the transistors 13, 14 are reliably repeated so as to maintain the oscillation even in the no-load condition.

Figure 7:
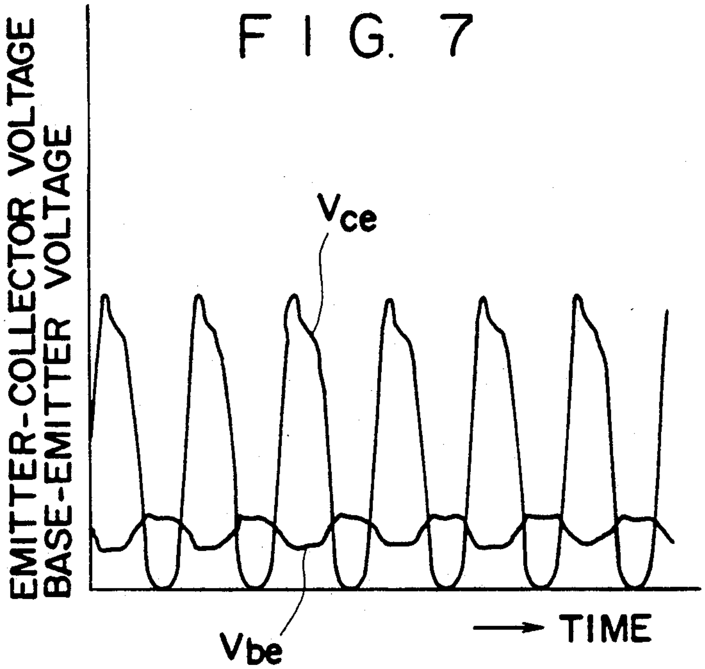
FIG. 7 is a waveform diagram of base-emitter voltage and emitter-collector voltage in transistors 13, 14.

FIG. 7 is a waveform diagram of base-emitter voltage Vbe and emitter-collector voltage Vce applied to the transistor 13 or the transistor 14 in the no-load condition.

It should be noted here that the voltage Vce actually has a peak value substantially higher than that of the Vbe as shown.

While the inverter of this this embodiment provides an output voltage in the form of an alternating voltage including a distorted wave, this is considerably improved by connecting the capacitor 33 for resonance in parallel to the primary coil 30P.

It should be understood, however, that this capacitor 33 may be eliminated so far as said improvement of the output voltage waveform is not desired.

In view of a fact that provision of said capacitor 33 for resonance necessarily causes the temperature of the boosting transformer 30 to rise, it is preferred to employ said capacitor 33 of an appropriate capacity in consideration of both the improvement of the output voltage waveform and the temperature of the transformer.

What is claimed is:

1. A push-pull inverter including a boosting transformer provided with a primary coil having a center tap and a secondary coil, first connecting means for connecting the secondary coil to a load, and first and second switching elements having control electrodes adapted for alternate interruption of the current flowing through a primary coil section on one side and the current flowing through a primary coil section on the other side with respect to the center tap, wherein there is provided a capacitor adapted to connect the control electrodes of the first switching element and the second switching element and second connecting means for connecting said capacitor in series between a load connected to said first connecting means and said secondary coil; and wherein there is provided a positive feedback circuit adapted to activate the first and second switching elements alternately so that a load current may flow through said capacitor.

2. A push-pull inverter as recited in claim 1, wherein a capacitor for resonance circuit is connected in parallel to he primary coil of the transformer.

3. A push-pull inverter as recited in claim 1, wherein a capacitor is connected between respective main electrodes and respective control electrodes of the first and second switching elements.

4. A push-pull inverter as recited in claim 1, further including a positive feedback circuit in which the secondary coil of the boosting transformer is connected at its low voltage side to the control electrode of the first switching element and at its high voltage side to the control electrode of the second switching element via a load.

5. A push-pull inverter as recited in claim 1, further including an auxiliary feedback circuit adapted to feed a primary coil voltage generated when the first switching element interrupts the current flowing through the primary coil section on one side of the center tap back to the control electrode of the second switching element and to feed a primary coil voltage generated when the second switching element interrupts the current flowing through the primary coil section on the other side of the center tap back to the control electrode of the first switching element.

* * * * *